United States Patent [19]
Dzus et al.

[11] 3,905,411
[45] Sept. 16, 1975

[54] FASTENER RECEPTACLE WITH PROTECTIVE CAP

[75] Inventors: Theodore Dzus; Peter Schenk, both of West Islip, N.Y.

[73] Assignee: Dzus Fasterer Co., Inc., West Islip, N.Y.

[22] Filed: May 29, 1974

[21] Appl. No.: 474,235

[52] U.S. Cl.................... 151/21 R; 85/35; 151/41.7
[51] Int. Cl.²..................... F16B 37/14; F16B 39/28
[58] Field of Search......... 151/41.7, 69, 21 R, 21 C, 151/19 R; 85/35, 55

[56] References Cited
UNITED STATES PATENTS

| | | | |
|---|---|---|---|
| 2,424,604 | 7/1947 | Dzus | 151/21 R |
| 2,877,817 | 3/1959 | Rockwell | 151/41.7 X |
| 2,899,220 | 8/1959 | Abrams | 151/41.7 X |
| 3,037,542 | 6/1962 | Boyd | 151/21 C |

FOREIGN PATENTS OR APPLICATIONS

| | | | |
|---|---|---|---|
| 46,475 | 3/1909 | Switzerland | 85/55 |

Primary Examiner—Ramon S. Britts
Attorney, Agent, or Firm—Kane, Dalsimer, Kane, Sullivan and Kurucz

[57] ABSTRACT

A receptacle adapted to be mounted on a member to be fastened and to receive a stud engaged with another member so as to fasten the two members together. The receptacle includes an elongated hollow body portion open at both ends and a flange extending laterally from one end of the body for mounting the receptacle to one member. The body has weakened zones and is surrounded by a compression spring tending to compress the body with the assistance of the weakened zones. A protective cap surrounds at least a substantial portion of the body and is interengaged with the body in position to capture debris displaced from the receptacle or a stud interengaged therewith when two members are fastened together.

5 Claims, 4 Drawing Figures

PATENTED SEP 16 1975 3,905,411

FIG. 2
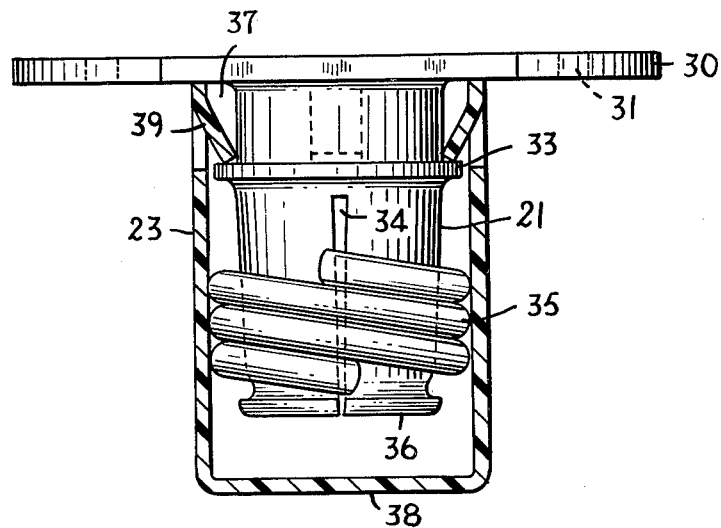
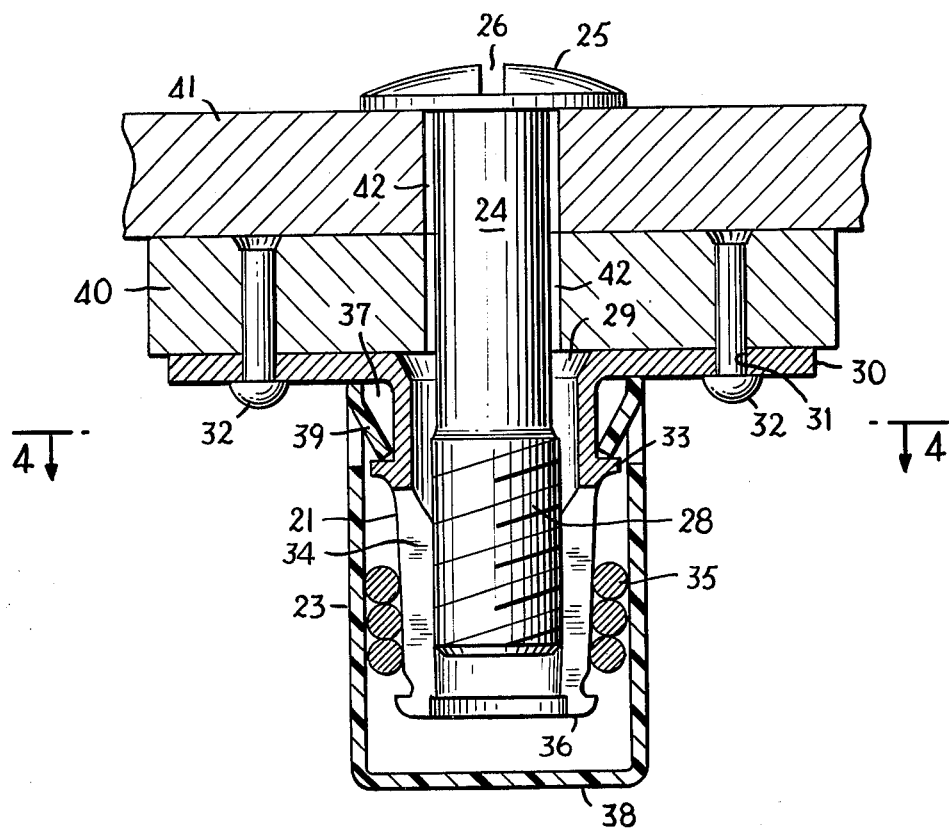
FIG. 3

FASTENER RECEPTACLE WITH PROTECTIVE CAP

BACKGROUND OF THE INVENTION

In certain types of cabinets and panel arrangements it has been found appropriate and desirable to utilize fastener assemblies which can be quickly and easily engaged and disengaged to fasten the cabinet and permit access to the cabinet respectively. One type of fastener which is quite common is one which employs a receptacle mounted in the base of the panel or cabinet and a stud passed through the door or facing of the cabinet and interengaged with the receptacle when the assembly is aligned for fastening purposes. A number of fasteners are generally spaced about the exposed surface in appropriate arrangement to assure positive interengagement of the members being fastened in a rigid fashion.

Certain environments require a large number of such fasteners in a given panel area or require fasteners that are at least quick and efficient to interengage and disengage.

A common type of fastener is one which employs a threaded stud and a receptacle with a quad lead thread therein and a weakened base surrounded by a compression spring. Insertion of the stud permits immediate interengagement between the thread of the stud and the quad lead thread and insertion of the stud to the fully extended position is facilitated by the weakened base surrounded by the compression spring which is subject to expansion. In assemblies where that type of fastener is employed, particularly when the fastener is of metallic components rapid and frequent assembly and disassembly of the fasteners sometimes result in chipping or breaking off of particles of either the stud or receptacle portion. This is particularly true where the full thread on the stud is to be interengaged with the quad lead thread on the receptacle. In some environments this is of no consequence since the broken particles and bits and pieces will be dispersed as meaningless waste. However, in other environments such as in electronics where complex and very sensitive elements are employed, which are often responsive to introduction or influence of nearby metallic particles, deleterious effects on the working components housed within a cabinet or panel arrangement can occur. In environments where electronic or computerized components are utilized, fastener elements have to be carefully checked and handled so that broken particles thereof do not inhibit areas which could result in harm to the highly sensitive systems. The electronic environment is merely one of many which can be readily envisioned where it would be desirable to insure that particles of the fastener assemblies do not break off and interfere with normal operation.

SUMMARY OF THE INVENTION

With the above background in mind, it is among the primary objectives of the present invention to provide a receptacle for engagement with a stud for use in fastening two members together wherein a protective cap is located over the portion of the receptacle where debris would be displaced so that the debris is captured and held within the protective cap. In this manner, there is no danger of broken particles being displaced from the stud and receptacle during assembly and falling free to interfere with sensitive elements being housed in the area of the receptacle. The receptacle with the protective cap is designed so that it can be quickly and efficiently assembled at low cost without the necessity of additional components. The result is a receptacle with a protective cap to guard against fallout or debris and which is of relatively the same basic cost as the similar receptacle without the protective cap. The increase in manufacturing, assembly and installation cost is minimal over that of a receptacle without the protective cap.

In summary, a receptacle is provided which is adapted to be mounted on a member to be fastened and to receive a stud engaged with another member so as to fasten the two members together. The receptacle includes an elongated hollow body portion open at both ends and a flange extending laterally from one end of the body for mounting the receptacle to one member. The body has weakened zones and is surrounded by a compression spring tending to compress the body with the assistance of the weakened zones. Finally, a protective cap surrounds at least a substantial portion of the body and is interengaged with the body in position to capture debris displaced from the receptacle or a stud interengaged therewith when two members are fastened together.

With the above objectives, among others, in mind, reference is had to the attached drawings.

BRIEF DESCRIPTION OF THE DRAWINGS

In the drawings:

FIG. 2 is a sectional elevation view of the receptacle of the invention;

FIG. 3 is a sectional elevation view of the receptacle of the invention shown mounted to one member and interengaged with a stud so as to hold two adjacent members together.

DESCRIPTION OF THE PREFERRED EMBODIMENT

Figure 1:
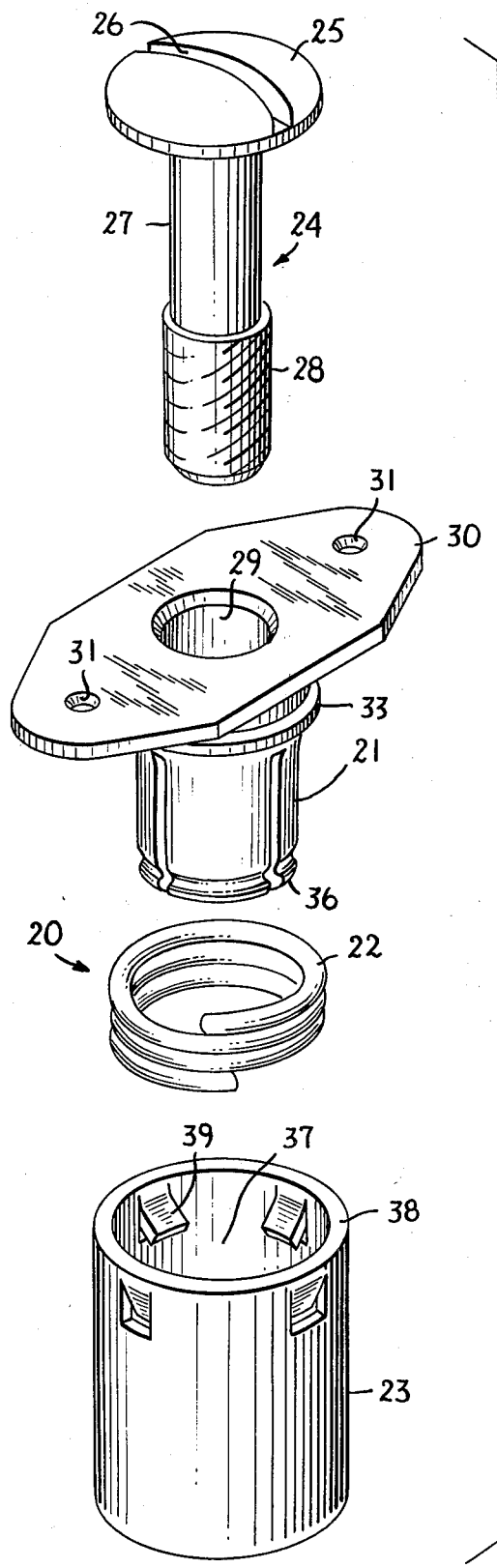
FIG. 1 is an exploded perspective view of the receptacle of the present invention and a stud to be utilized therewith.
Figure 4:
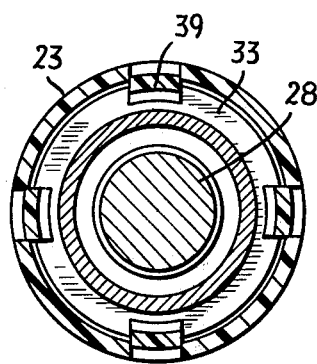
FIG. 4 is a sectional plan view thereof taken along the plane of line 4—4 of FIG. 3.

Receptacle 20 includes a body 21, a compression spring 22 and a protective cap 23. The receptacle is adapted to receive a stud 24.

Stud 24 is of the conventional type with an enlarged head 25 which may have an appropriate slot 26 for engagement with a tool to rotate the stud for fastening purposes. The elongated stem 27 of the stud is at least partially threaded along portion 28 to facilitate locking interengagement with an appropriate receptacle.

The body of the receptacle is substantially cylindrical in configuration and has a central bore 29 therethrough. The bore is large enough to receive stem 27 of stud 24.

Extending laterally from one end of receptacle body 21 is a flange 30 which has a flat upper surface for engagement with a member to be fastened. Appropriate holes 31 are provided in flange 30 through which screws or rivets 32 may be extended to mount the receptacle to a member to be fastened.

Intermediate the ends of body 21 and spaced from flange 30 is an annular rib 33 extending about the circumference of body 21 and laterally therefrom. Between rib 33 and the end of body 21 opposite to the flanged end are longitudinal slots 34. The slots are spaced periodically about the circumference of the body and extend from the open end of opposite flange 30 to a point intermediate the ends of the body short of communication with rib 33. Slots 34 form weakening zones for the body portion so as to permit ready compression of the portions of the body located between the slots. The compression force is supplied by a compression spring 35 mounted on the body in the area of the weakened zones formed by the slots. Spring 35 is under compression and normally exerts a force on body 21 so as to compress the body to the extent permitted by slots 34 thereby diminishing the interior diameter of part of body 21. A lip 36 is located at the end of the body opposite to the flanged end to assist in retaining compression spring 35 on the body.

Protective cap 23 is cylindrical in configuration and has one open end 37 and a closed end 38. Receptacle body 21 is inserted into open end 37 of cap 23 until the ring 38 at the open end 37 engages with the undersurface of flange 30. In this position protective cap 23 surrounds all of receptacle of body 21 with the exception of flange 30. Compression spring 35 is also housed within protective cap 23 when it is fully seated in position.

To retain cap 23 in position about body 21, appropriate retention means are employed. As shown, a plurality of tabs 39 are formed in cap 23 adjacent to open end 37 and extend normally downwardly and inwardly with respect to the cap. Tabs 29 are somewhat resilient so as to permit their displacement when an appropriate force is applied. Tabs 39 are integral at their upper ends to the walls of cap 23 so that as the cap 23 is positioned over body 21 toward the fully seated position the downwardly and inwardly extending surfaces of tabs 39 will come into engagement with annular rib 33 on the body and be displaced outwardly toward confirmation with the remainder of the walls of the cap. The cap can then be fully seated with its upper rim in substantial engagement with the underside of the flange 30 at which point tabs 39 will be past rib 30 and free to return to the relaxed position at which time they will return to their normal downward and inward extended position so as to form a series of spaced lips in engagement with the upper surface of rib 33. In this position removal of cap 23 is prevented since a removal force of the cap will not tend to displace tabs 39 but will tend to further increase their engagement with rib 33 and other surfaces on body 21 so that the cap cannot be removed. Cap 23 is then positively locked in position on receptacle body 21 and the receptacle is ready for assembly and use.

In the embodiment shown, a series of spaced tabs are formed by punching openings in the walls of receptacle 23 so as to displace the punched out material inwardly while maintaining a portion integrally connected with the remainder of the receptacle. The result is the inwardly and downwardly extending tabs 39 as depicted in the drawings. The number of tabs are a matter of choice and naturally other convenient or conventional fastener means can be employed to couple the cap 23 with body 21 in place of tabs 39.

In operation, once the cap 23 has been coupled with the body 21 and compression spring 22 has been properly positioned on the body 21 so as to be included within cap 23 the receptacle 30 is fastened to member 40 in any conventional fashion. As shown in FIG. 3, rivets 32 may be passed through appropriate holes 31 in flange 30 and through openings in member 40 so as to mount the receptacle to member 40. The other member 41 to be coupled to member 40 is then aligned so that a continuous opening 42 is formed through both members and is aligned with opening 29 in the receptacle. Stud 24 is then passed through opening 42 and into receptacle opening 29. An appropriate tool is inserted into head slot 26 and the stud is rotated with the threads 28 thereon immediately interengaging with the quad lead thread on the inner surface of body 21 in the zone of the location of slots 34 which is the weakened area. Continual rotation of stud 24 will thread the stud downwardly into the constricted portion of the receptacle where it will expand the receptacle against the force of compression spring 22 until the stud is fully seated in the position shown in FIG. 3. At that point, compression spring 22 will exert a greater force than normal on the receptacle and stud assembly tending to retain the stud in fixed position and providing a tight fastener and stud assembly.

To remove the stud and disassembly the fastener, it is merely necessary to rotate the stud in the opposite direction thereby disengaging the threaded interengagement and removing the stud through opening 29 in the receptacle and openings 42 in members 40 and 41. Any broken pieces of material which may be displaced or broken off from the receptacle or the stud during assembly or disassembly will be captured in cap 23. The captured bits and pieces will be retained in the cap and to prevent them from contaminating the surrounding area.

In regard to materials, it has been found that an acceptable arrangement can be had with a stainless steel stud and an aluminum receptacle body and cap. Naturally, other conventional materials could be readily envisioned for use as part of the assembly.

Thus, the above discussed objectives of the present invention, among others, are effectively attained.

What is claimed is:

1. A receptacle adapted to be mounted on a member to be fastened to receive a stud engaged with another member so as to fasten the two members together comprising:
   an elongated hollow body portion open at both ends and having securing means on the inner surface thereof for engagement with a stud;
   a flange extending laterally from one end of the body for mounting the receptacle to one member;
   the body having weakened zones in the area of the securing means and being surrounded by a compression spring tending to compress the body with the assistance of the weakened zones;
   a protective cap of resilient material surrounding at least a substantial portion of the body and interengaged with the body, the cap having a closed end in position to capture debris displaced from the receptacle or a stud interengaged therewith when two members are fastened together;
   an annular rib extending laterally from the exterior surface of the body intermediate the ends thereof;
   the cap having resilient tabs normally extending downwardly and inwardly with respect to the closed end thereof so that positioning of the cap about the body will result in the tabs being deformed so as to pass over the rib and return to their initial configuration, the bottom free edges of the tabs being engaged with the upper surface of the annular rib to retain the cap on the body of the receptacle; and the protective cap surrounding and capturing the compression spring as well as the substantial portion of the body of the receptacle, the upper edge of the protective cap being positioned substantially in interengagement with the undersurface of the flange of the body of the receptacle.

2. The invention in accordance with claim 1 wherein there are four tabs spaced about the circumference of the body and are formed by displacement of appropriate portions of the body walls inwardly.

3. The invention in accordance with claim 1 wherein a stud is assembled with the receptacle, the securing means comprising quad lead threads in the weakened zone area, the stud having threads thereon for interengagement with the quad lead threads whereby introduction of the stud causes interengagement of the threaded surfaces and as the stud is advanced it tends to expand in the receptacle against the force of the compression spring in the weakened zone area so as to form a tight interengagement between stud and receptacle and tightly fasten two members together.

4. The invention in accordance with claim 1 wherein the receptacle is formed of aluminum material and is adapted to receive a stud formed of stainless steel material.

5. The invention in accordance with claim 1 wherein the zones of weakening are formed by longitudinal slots spaced about the the circumference of the body portion and extending from the end remote from the flanged end to a predetermined point intermediate the ends of the body of the receptacle.

* * * * *